No. 743,364. PATENTED NOV. 3, 1903.
E. B. WILFORD & A. W. SCHRAMM.
ELECTRIC MOTOR.
APPLICATION FILED AUG. 10, 1903.
NO MODEL.
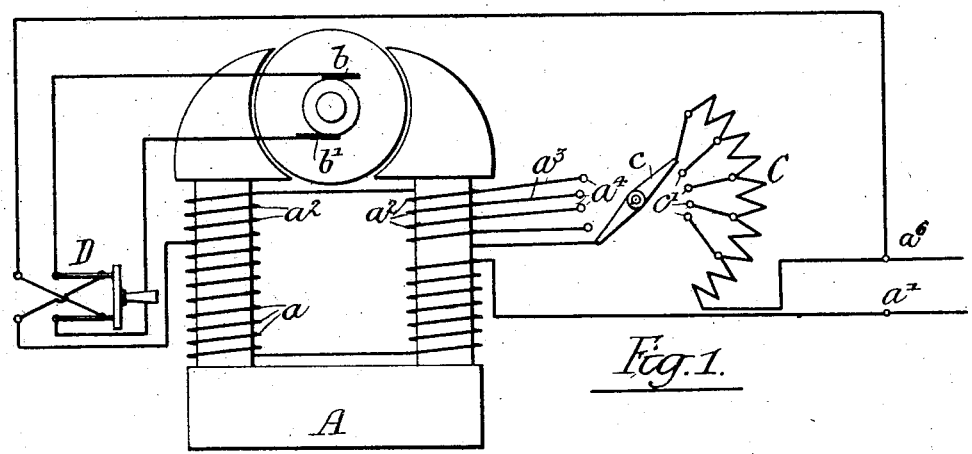
Fig. 1.
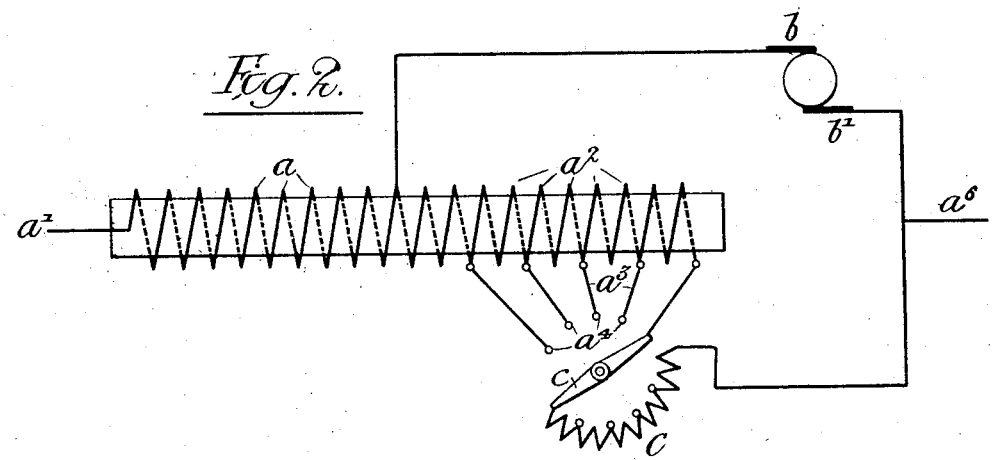
Fig. 2.
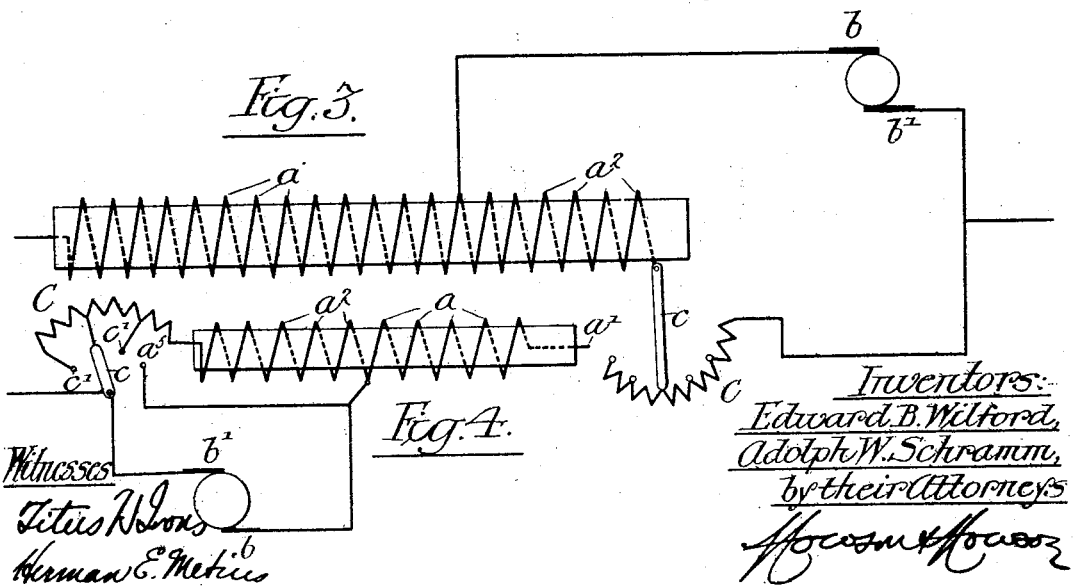
Fig. 3.
Fig. 4.
Witnesses:
Inventors:
Edward B. Wilford,
Adolph W. Schramm,
by their Attorneys No. 743,364.

Patented November 3, 1903.

UNITED STATES PATENT OFFICE.

EDWARD B. WILFORD AND ADOLPH W. SCHRAMM, OF PHILADELPHIA, PENNSYLVANIA.

ELECTRIC MOTOR.

SPECIFICATION forming part of Letters Patent No. 743,364, dated November 3, 1903.

Application filed August 10, 1903. Serial No. 168,940. (No model.)

*To all whom it may concern:*

Be it known that we, EDWARD B. WILFORD and ADOLPH W. SCHRAMM, citizens of the United States, and residents of Philadelphia, Pennsylvania, have invented certain Improvements in Electric Motors, of which the following is a specification.

Our invention relates to certain improvements in motors designed to be operated by single-phase alternating current, having for its object the provision of a motor which it shall be possible to control within relatively wide variations of speed and which, moreover, shall have relatively large power at the various speeds.

Heretofore alternating-current motors of the so-called "direct-current" type have been operated by single-phase current; but in order to control their speed it has been customary to provide a shunt around the armature-terminals, which shunt included an inductive or non-inductive resistance. We have found, however, that this method of control, as well as that in which the primary winding of a transformer was connected in series with the field-winding of the motor and the secondary of the transformer in a closed circuit including the armature of the motor, was unsatisfactory, owing to the fact that upon the application of a load to the motor the speed thereof fell off very materially. It would appear that the cause for this lowering of speed under load was due to the fact that the shunt around the armature gave rise to a phase difference between the current in the field-winding and that flowing in the armature, and we have found that by connecting the armature to the field-windings in such a manner that a portion only of said windings is in series with the armature the remaining portion thereof gives rise to an action which maintains or tends to maintain the armature and field currents in phase with each other.

In the accompanying drawings, Figure 1 illustrates a motor having its various parts connected in the manner contemplated by our invention. Fig. 2 is a diagrammatic view illustrating more clearly the connections of the motor shown in Fig. 1, and Figs. 3 and 4 are diagrammatic views illustrating modified arrangements of the motor connections shown in Fig. 2.

In Figs. 1 and 2 of the above drawings, A is the motor-frame, upon which are wound the field-coils of the machine, a portion $a$ of these coils being so connected that it is permanently in circuit between a terminal $a'$, connected to one of the supply-mains and to one of the armature-terminals. The remainder $a^2$ of the field-winding has one of its ends connected to the point of junction of the connection from the terminal $b$ of the armature and the field-winding $a$, being provided with a series of taps $a^3$, connected to contact-buttons $a^4$, arranged in the case illustrated on the arc of a circle. A contact-arm $c$ is provided, so as to engage with these buttons $a^4$ and also with a series of buttons $c'$, connected at intervals to a coil of resistance C. The arm and these two sets of contact-buttons are preferably so arranged that a section of the resistance and a section of the field-winding may be simultaneously cut into or out of circuit by properly manipulating said arm. The second armature-terminal $b'$ is connected to the supply-main $a^6$ and to one end of the resistance-coil C.

If desired, a switch D may be provided, whereby the relative connections of the two armature-terminals and of the field-windings, respectively, may be altered to reverse the direction of rotation of the armature.

As illustrated in Fig. 3, we may, if desired, connect the end of the contact-arm directly to the end of the portion $a^2$ of the field-winding, or, as in Fig. 4, this arm may be connected directly to the second supply-main, while the resistance-coil, with its contacts, is directly connected to the field-winding. In either case the amount of resistance in circuit with the field may be varied by properly manipulating said arm.

In operation the arm $c$ cannot be so moved as to cut out all of the resistance C, and it will be noted that some of the field-winding will always remain in circuit unless the resistance and said portion of the field are cut out by the use of connections arranged as in Fig. 4, when the armature will be caused to quickly come to a standstill by being shortcircuited. For this purpose we employ an extra contact-piece $a^5$ and connect this to the terminal of the armature which is connected directly to the field-coil. Under operating conditions the motor is caused to increase its speed by cutting out the resistance or by simultaneously cutting out the resistance and portions of the field-winding $a^2$. We have found that by this arrangement of connections the motor is more powerful and performs its work in a manner more satisfactory than has hitherto ordinarily been the case with machines of this general type.

We claim as our invention—

1. The combination in a single-phase, alternating-current motor, of a field-winding having one terminal connected to a supply-main, an armature having one of its terminals connected to some point of the field-winding between its ends, and its other terminal connected to a second supply-main, with a resistance in circuit between said second armature-terminal and the portion of the field-winding beyond the part thereof included between the armature connection and the first supply-main, substantially as described.

2. The combination in a single-phase, alternating-current motor, of an armature and a field-winding with a resistance connected to the field-winding and to one of the armature-terminals, said other armature-terminal being connected to said field-winding in such manner that a portion of the field is in series with said armature and the remainder, with the resistance, is in shunt thereto, substantially as described.

3. The combination in a single-phase, alternating-current motor, of a field-winding having one terminal connected to a supply-main, an armature having one of its terminals connected to a point on the field-winding between the ends thereof and its other terminal connected to a second supply-main, with a resistance in circuit between said second armature-terminal and that portion of the field-winding beyond the part thereof included between the armature connection and the first supply-main, and means for simultaneously varying the amount of said resistance and the number of turns of field-winding in circuit, substantially as described.

4. The combination in a single-phase, alternating-current motor, of a field-winding connected at one end to a supply-main and having a resistance connected to its other end, contacts for said resistance and a contact-arm connected to a second supply-main and placed to engage said contacts, with an armature having one of its terminals also connected to said second supply-main and to some point on the field-winding between the two terminals thereof, substantially as described.

5. The combination in a single-phase, alternating-current motor, of a field-winding connected at one end to a supply-main and having a resistance connected to its other end, contacts for said resistance, and a contact-arm connected to a second supply-main and placed to engage said contacts, with an armature having one of its terminals also connected to said second supply-main and to some point on the field-winding between the two terminals thereof, and an auxiliary contact-piece connected to the terminal of the armature in connection with the field-winding, substantially as described.

In testimony whereof we have signed our names to this specification in the presence of two subscribing witnesses.

EDWARD B. WILFORD.
    ADOLPH W. SCHRAMM.

Witnesses:
 JAMES C. AROYER,
 JOS. H. KLEIN.